United States Patent
Lane

(10) Patent No.: US 7,726,680 B2
(45) Date of Patent: Jun. 1, 2010

(54) EXTENSION TRAILER

(76) Inventor: Luther Williams Lane, 512 N. Marion, Malden, MO (US) 63863

( * ) Notice: Subject to any disclaimer, the term of this patent is extended or adjusted under 35 U.S.C. 154(b) by 84 days.

(21) Appl. No.: 12/148,374

(22) Filed: Apr. 18, 2008

(65) Prior Publication Data

US 2008/0258428 A1 Oct. 23, 2008

Related U.S. Application Data

(60) Provisional application No. 60/932,268, filed on May 30, 2007, provisional application No. 60/925,225, filed on Apr. 19, 2007.

(51) Int. Cl.
*B60P 3/10* (2006.01)
(52) U.S. Cl. .................................. 280/482; 280/491.2
(58) Field of Classification Search ................ 280/482, 280/491.2, 491.1, 414.1
See application file for complete search history.

(56) References Cited

U.S. PATENT DOCUMENTS

| | | | | |
|---|---|---|---|---|
| 3,989,266 A | * | 11/1976 | Foster | 280/414.1 |
| 4,232,990 A | * | 11/1980 | Pierce | 414/559 |
| 4,331,346 A | * | 5/1982 | Walters | 280/414.1 |
| 4,620,716 A | * | 11/1986 | Carbone | 280/414.1 |
| 4,623,161 A | * | 11/1986 | Sprague | 280/414.1 |
| 4,779,887 A | * | 10/1988 | Briggs | 280/414.1 |
| 5,012,394 A | * | 4/1991 | Woodward | 362/198 |
| 5,322,315 A | * | 6/1994 | Carsten | 280/479.2 |
| 5,806,872 A | * | 9/1998 | Szczypski | 280/479.2 |
| 6,951,346 B2 | * | 10/2005 | Brackett et al. | 280/491.2 |
| 7,455,310 B2 | * | 11/2008 | Hyslop | 280/414.1 |

* cited by examiner

*Primary Examiner*—Tony H. Winner
(74) *Attorney, Agent, or Firm*—Mark Manley

(57) ABSTRACT

An extendable trailer comprising wheels carrying a fixed frame, and a fixed support tube carrying a plurality of bearings that support an extendable support tube passing through said fixed support tube. A portion of a trailer hitch supported on the extendable support tube and a fixed pipe carried inside the extendable support tube protecting wires for trailer lights and accessories. The trailer has a first extended position where the tongue is extended and the length of the trailer is the greatest and a second position where the tongue is collapsed back into the trailer.

14 Claims, 6 Drawing Sheets

EXTENSION TRAILER

RELATED APPLICATIONS

This application claims priority benefit under 35 USC 119 (e) of co-pending provisional patent applications 60/925,225 filed Apr. 19, 2007 and 60/932,268 filed May 30, 2007 filed by present inventor and having the title 'extension trailer' which are incorporated by reference.

BACKGROUND OF THE INVENTION

Trailer transportation has existed for a long time. A common problem in boat trailers is the problem associated with backing a trailer into the water such that a boat can be floated off the trailer into the water. This commonly requires that the trailer be partially submerged in the water and that the vehicle transporting the boat be backed up either close to the edge of the water or more commonly partially into the water. Typically there is a sloped ramp designed for this purpose that slopes into the water. Accidents commonly occur where the transport vehicle ends up getting too deep in the water. The process is reversed upon retrieving the boat. Again the trailer and transport vehicle must be backed down the slope and partially into the water such that the boat can be driven back onto the trailer.

Patent application 2004/0075242 from Richards gives one example of a prior trailer designed with an extended tongue to assist in placing the boat in the water. While application 2004/0075242 discloses a potentially useful concept it is lacking. It fails to solve problems associated with the extension tongue concept such as how the wiring for the trailer lights would work and how the extension tongue can be kept from binding up under the weight of the boat.

As can be seen there is a need for a simple boat trailer that allows for safer access to the water when unloading or loading a boat from a trailer.

SUMMARY OF THE INVENTION

According to the invention, an extendable trailer comprising;
wheels carrying a fixed frame, a fixed support tube carrying a plurality of roller bearings, and an extendable support tube passing through the fixed support tube and being supported in the fixed support tube on the roller bearings. A portion of a trailer hitch supported on the extendable support tube and a fixed pipe carried inside the extendable support tube to protect wires for trailer lights and accessories. The trailer has a first condition where the extendable support tube is collapsed and a second condition wherein the extendable support tube is extended. Trailer wiring in the support tube includes a coiled section that allows for elastic extension and retraction of the wiring as the trailer tongue is extended and retracted.

These and other advantages of the present invention will become apparent from the detailed description of the invention.

DETAILED DESCRIPTION OF THE DEVICE

Figure 1:
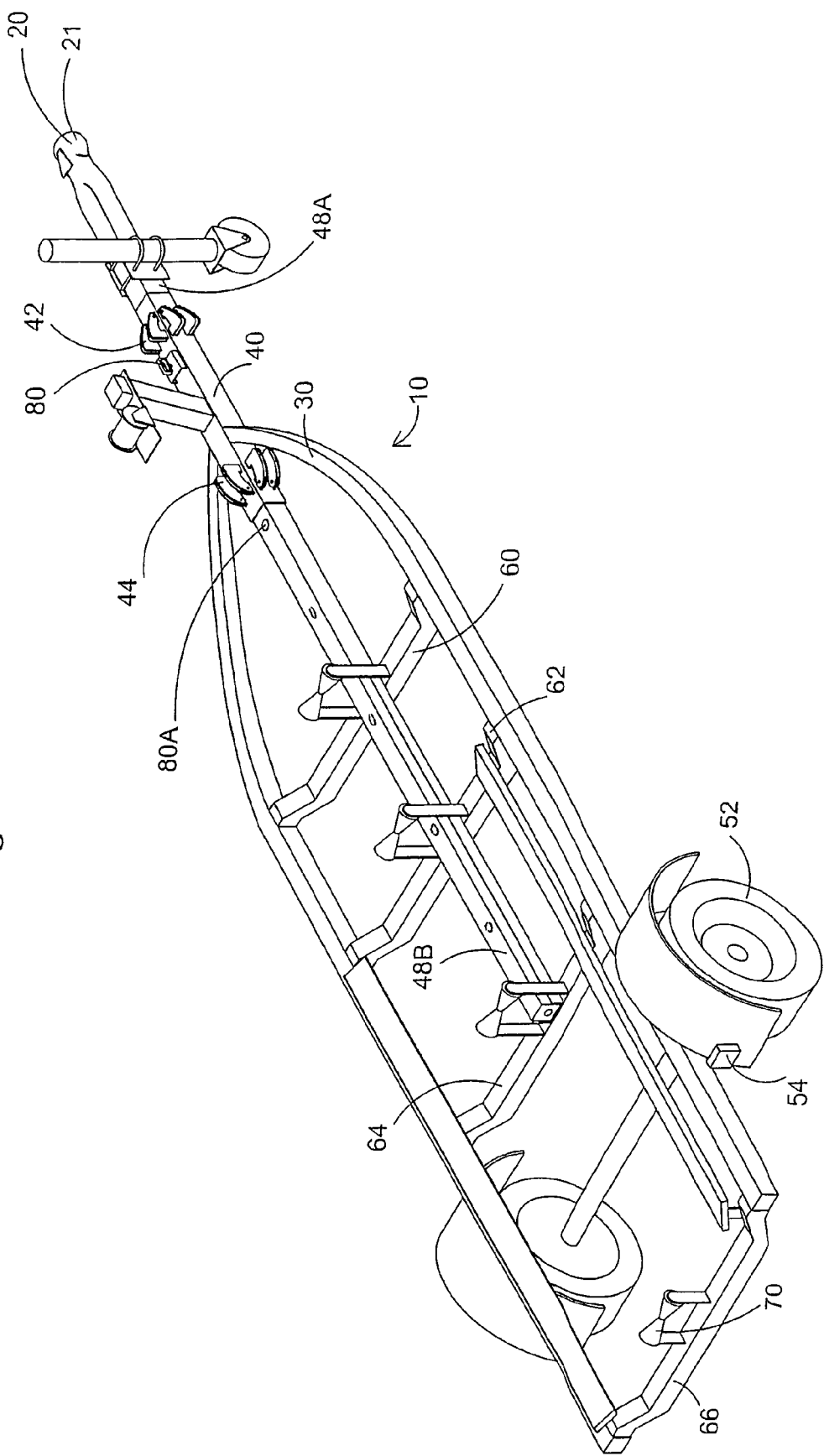
FIG. 1 shows a view of an embodiment of the invention.

FIG. 1 shows a boat trailer 10. The boat trailer 10 includes an extendable trailer tongue 20 and ball hitch receiver 21. The trailer 10 includes a frame 30 that can be constructed of tubular and channel steel for example. The frame 30 includes a fixed tongue support tube 40 that includes a forward bearing set 42 and a rearward bearing set 44. Bearing sets 42 and 44 can include rotatable bearings such as ball bearings or roller bearings. Passing through the tongue support tube 40 is a smaller tongue extension tube 48 that has a length over half the trailer length from a first end 48A that carries the tongue 20 to a back end 48B near the trailer wheels 52. A plurality of frame supports 60, 62, 64 and 66 are arranged along the trailer length to support the hull of a boat. Each frame support 60, 62, 64 and 66 carries a roller guide 70 to guide the boat onto the trailer 10. The fixed tongue support tube 40 includes a release pin 80, pulling the release pin 80 allows the trailer tongue 20 to extend making the overall length of the trailer 10 longer as shown in FIG. 2.

Figure 2:
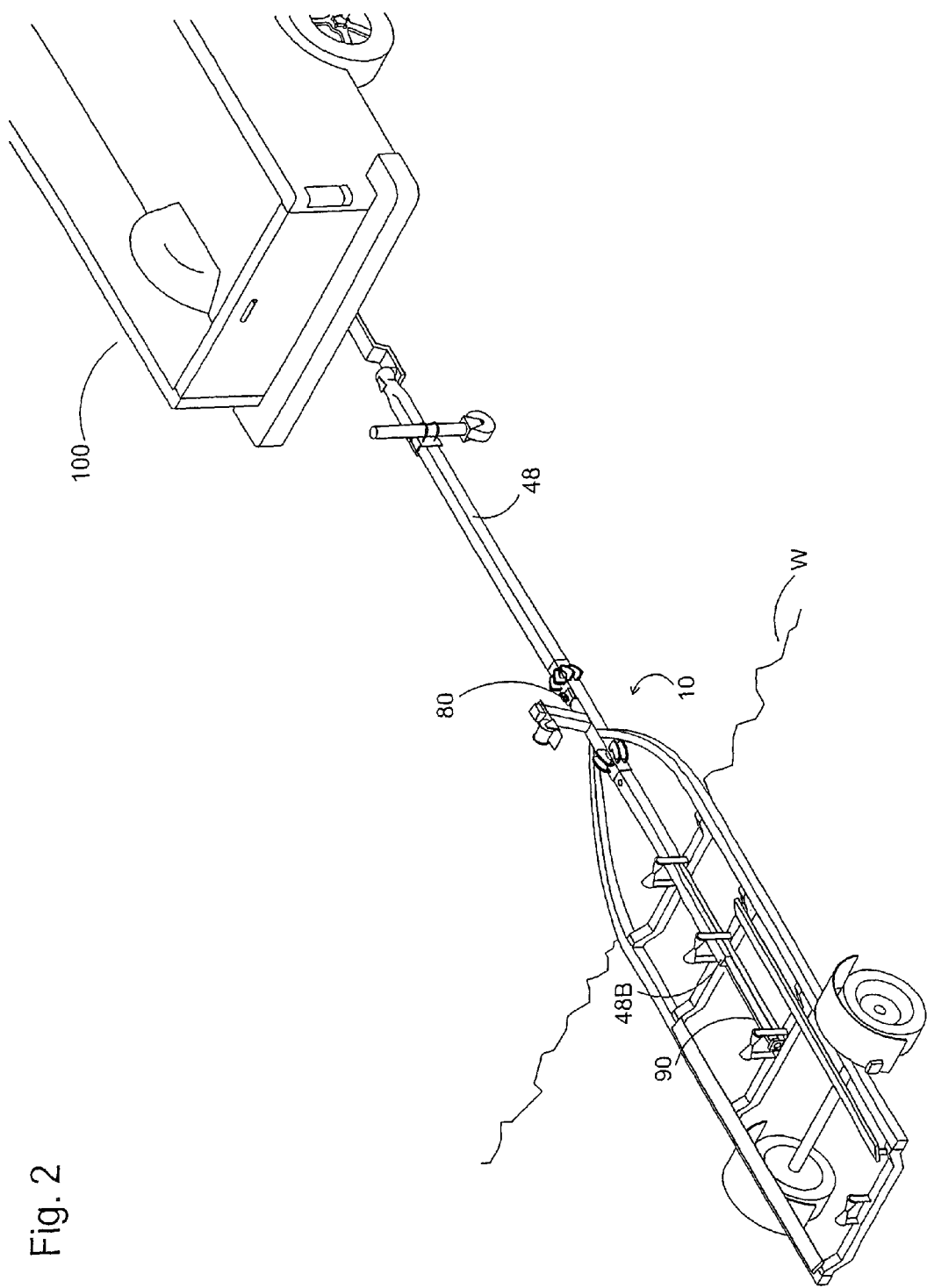
FIG. 2 shows the trailer from FIG. 1 with the tongue fully extended.

FIG. 2 shows the trailer 10 with the tongue 20 in an extended position. The tongue 20 is attached to a transport vehicle 100. The tongue extension tube 48 is now extended beyond the frame 30 of the trailer 10 such that the overall length of the trailer 10 is greater. The trailer 10 is shown going into water's edge 'W' and as can be seen the distance between the water's edge W and the transport vehicle 100 is much greater than it would be without the extension 48. It can be seen that the back end 48B of the extension tube 48 has also moved along channel 90, the back end 48B of extension tube can include a roller to roll in channel 90 to aid in the extension of tongue extension tube 48 relative to frame 30.

Figure 3:
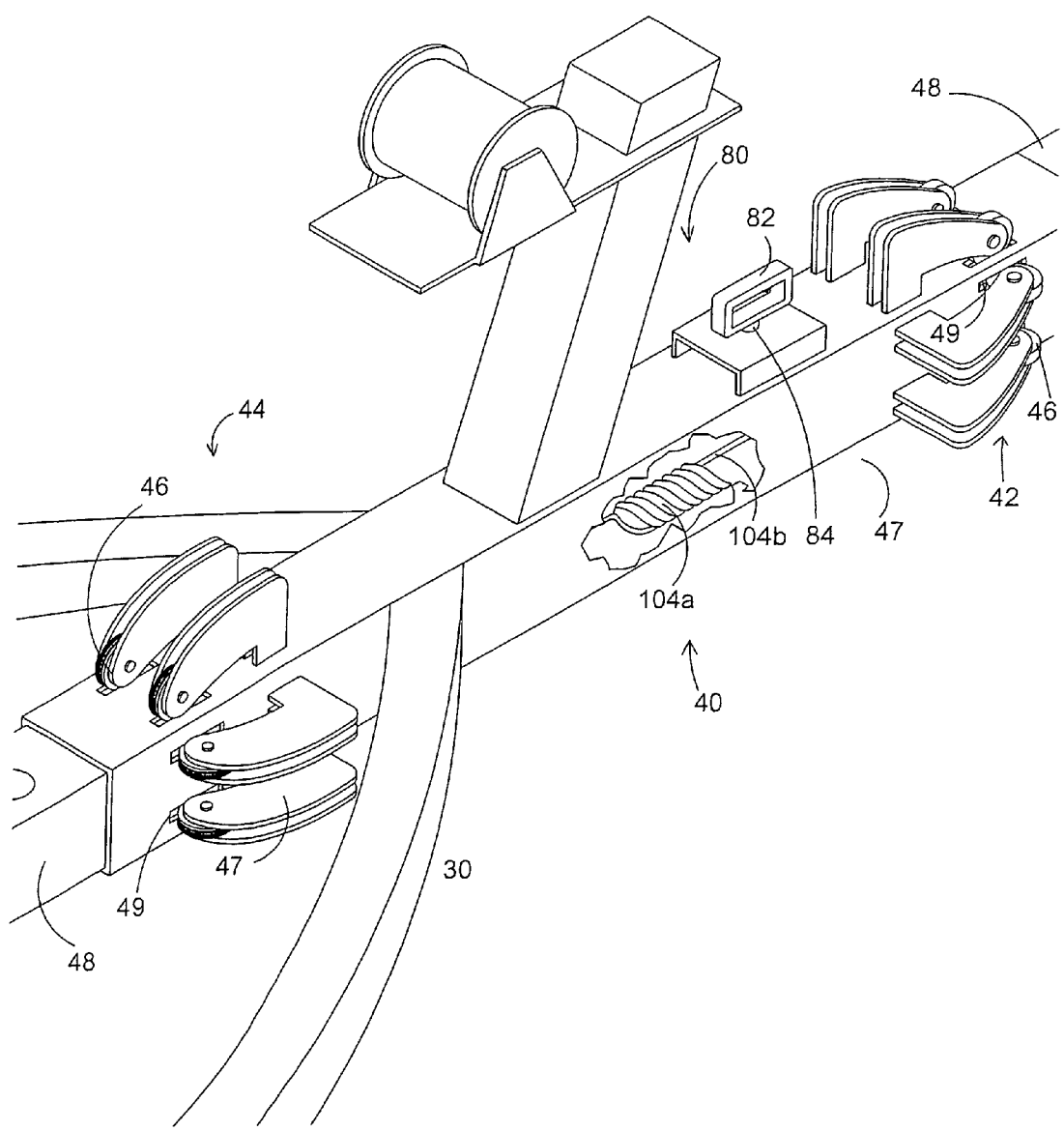
FIG. 3 shows details of the tongue support arrangement.

FIG. 3 shows details of the fixed tongue support tube 40. The forward bearing set 42, and rearward bearing set 44 each include a plurality of roller bearings 46 mounted in carriers 47. It will be understood that FIG. 3 shows only half of the roller bearings 46, the other half are on the other side and underneath of tongue support tube 40 such that the extension tube 48 is supported on all sides. Each roller bearing 46 has a passage 49 that allows it to pass through the support tube 40 and engage on the outer surface of extension tube 48. The tongue support tube 40 includes a release 80. The release 80 includes a handle 82 that can be pulled up to release a pin 84 from the tongue extension tube 48, once released the tongue extension tube 48 is free to move longitudinally relative to the trailer frame 30. The pin 84 is spring biased to the engaged position shown in FIG. 3. The breakaway section shows a coiled portion 104a of the trailer wiring harness 104. The wiring harness 104 has a first position when the tongue extension tube 48 is collapsed and a second position where the wiring harness 104 is extended. The wire 104 includes a coiled section 104a and a straight wire uncoiled section 104b. The coiled section 104a provides enough additional length for the wire harness 104 to be long enough when the trailer is extended to it's maximum length as shown in FIG. 2. It will be understood that while the pin 84 has been shown with a manual release handle, the pin could be set to release electrically with a solenoid controlled pin and a switch in the cab of the towing vehicle. In this arrangement, with electric trailer brakes the trailer length could be extended or retracted without leaving the towing vehicle.

Figure 4:
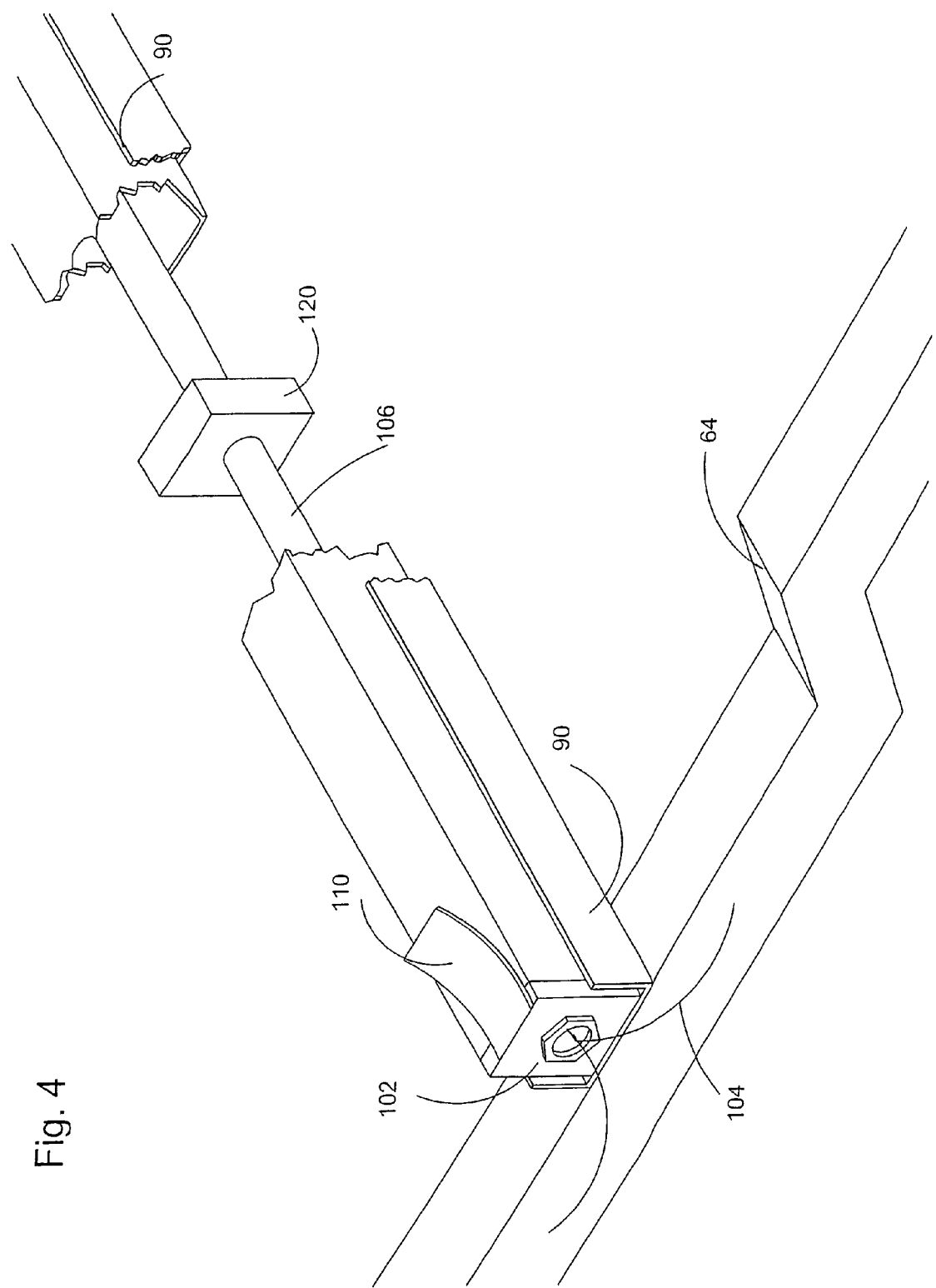
FIG. 4 shows additional details of the embodiment of FIG. 1.

FIG. 4 shows details of the trailer 10 including frame support 64 which supports a channel 90 along which the tongue extension tube 48 can ride. As can be seen, in the retracted position the back end 48B is adjacent end plate 102. The end plate 102 supports a pipe 106 that carries the electrical wiring harness 104 for the trailer 10 such as for lights 54 or electric trailer brakes. The pipe 106 and end plate 102 are fixed parts of the frame 30. The end plate 102 can include curved spring guides 110 that flare in the direction of the front tongue 20 end of the trailer such that when the back end 48B of the tongue extension tube 48 is moving toward the end plate 102, the curved guides 110 will tend to guide the back end 48B to its proper position and hold the end 48B against movement. The pipe 106 functions to protect the trailer wire harness 104 and can include a rubber support mount 120 that supports the pipe 106 within the tube 48 to prevent rattling.

Figure 5:
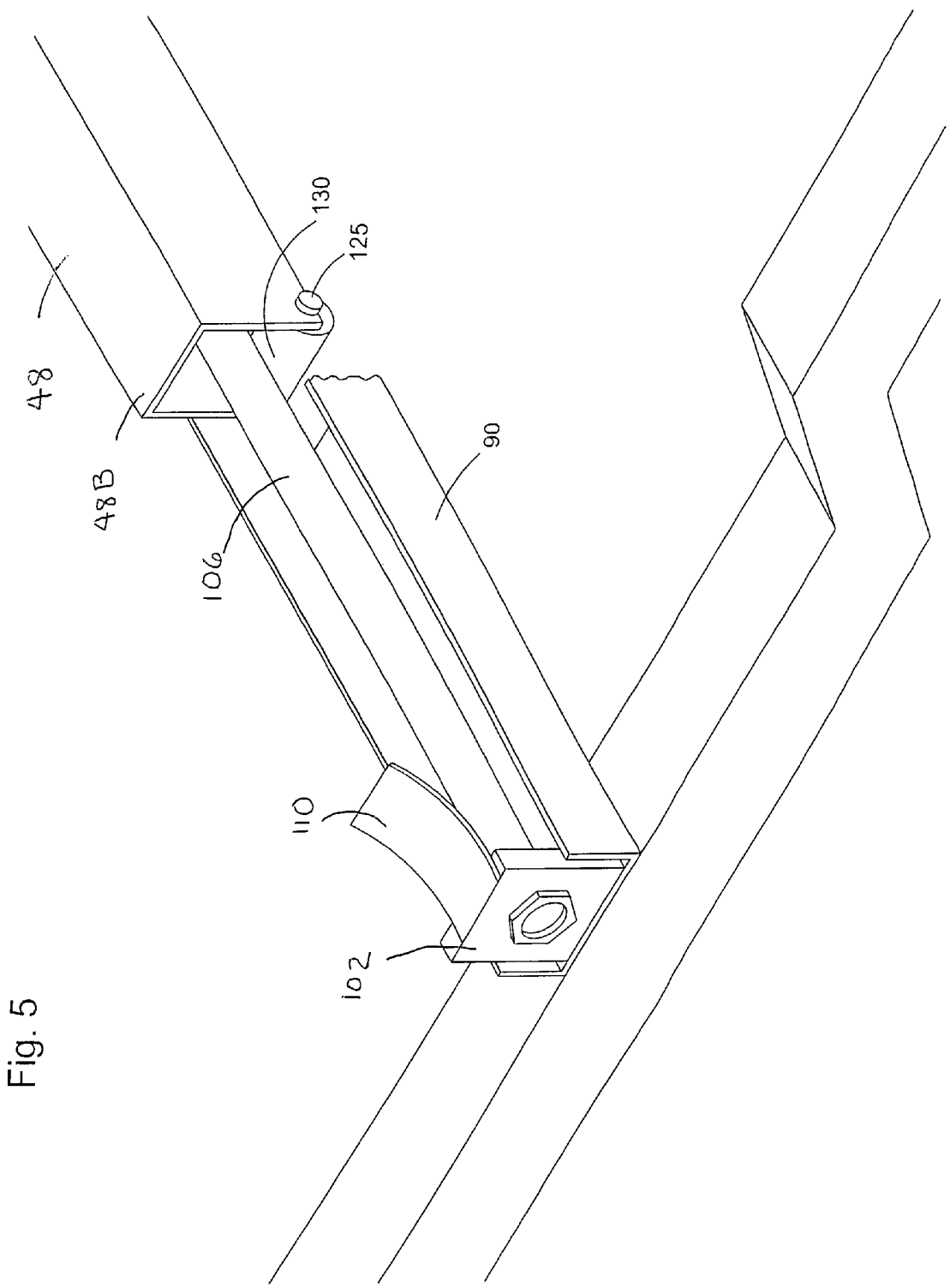
FIG. 5 shows additional details.

FIG. 5 shows details of the end plate 102 and back end 48B of the tongue extension tube 48 in a partially extended position. As can be seen the back end 48B is supported in channel 90 on roller 130 which has an axle 125. This allows the tongue extension tube 48 to be supported on rollers or bearings over its entire length. Experience has shown that even a single person can move a 14-16 foot boat on a trailer 10.

In operation, the trailer 10 is backed to the water edge 'W' with the trailer 10 in the retracted position shown in FIG. 1 with the tongue extension tube 48 contained within the fixed tube 40. The release pin 84 is then released and the trailer 10 is free to roll backwards relative to the towing vehicle 100 to the position shown in FIG. 2, extending the overall length of the trailer. Experience has shown that the bearing sets 42 and 44 as well as the roller on the back end 48B of tongue extension tube 48 are sufficient to allow a single operator to easily push the trailer 10 back. The tongue extension tube 48 can include a hole 80A on a top side such that when the trailer 10 is fully extended as shown in FIG. 2 the spring biased pin 84 will drop into hole 80A to lock the trailer 10 in the extended position. In the extended position, the towing vehicle 100 can still move the trailer 10 either deeper into the water if needed or can retrieve the trailer 10 when the boat has been removed or later when the boat is again loaded on the trailer 10. In operation the extension trailer 10 allows the towing vehicle 100 to maintain a safer distance from the waters edge W. The trailer accessories such as lights 54 or brakes (not shown) will continue to work in the trailer retracted and extended positions due to coiled wire harness 104. Alternatively the trailer 10 can be deployed from the retracted to the extended position by first setting the trailer brakes, then releasing pin 84 and driving the towing vehicle forward slowly to extend the trailer. The spring loaded pin 84 can drop into a hole 80 A to again lock the trailer in the extended position.

Figure 6:
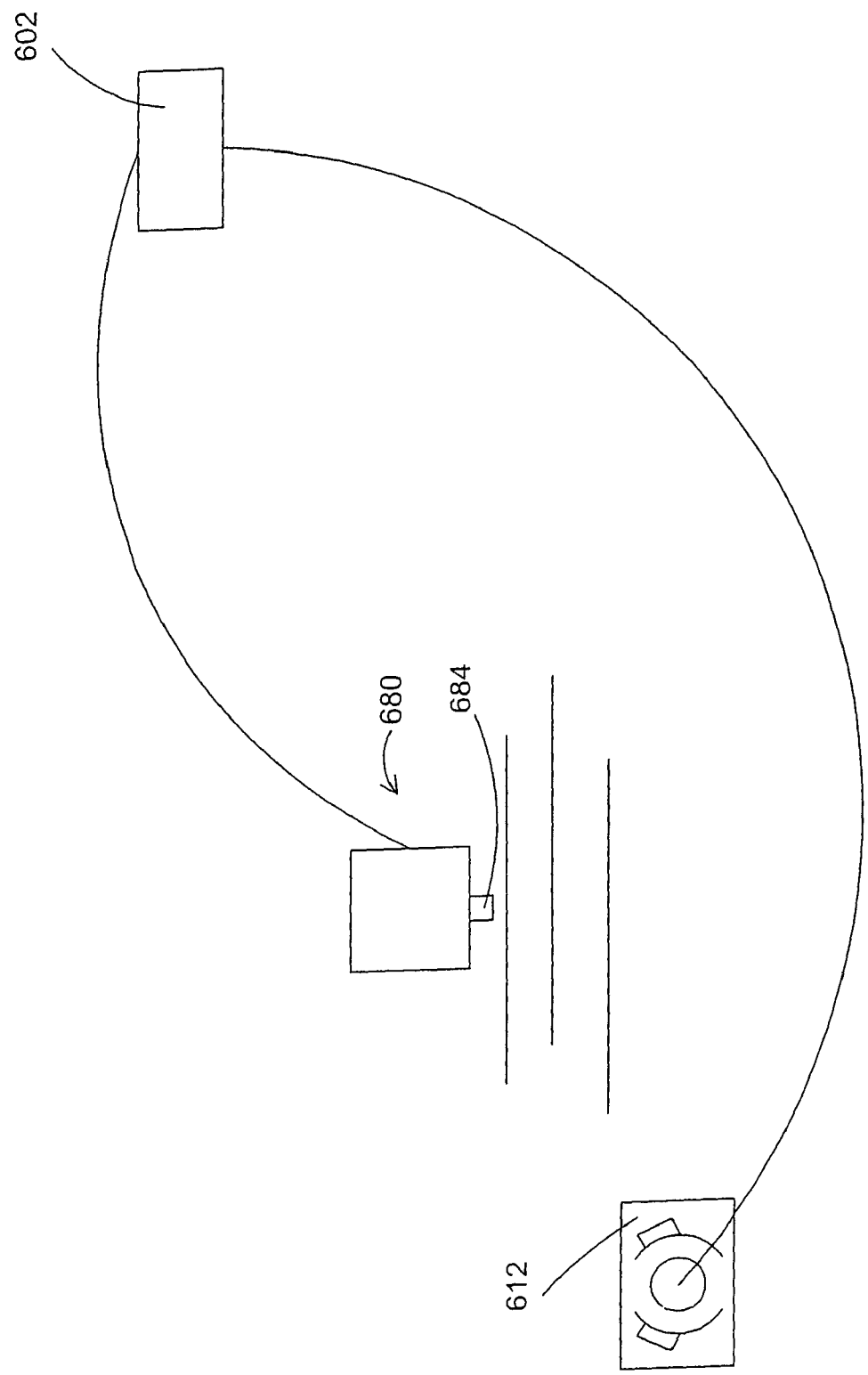
FIG. 6 shows details of an alternate embodiment.

FIG. 6 shows details of an alternate embodiment wherein the release mechanism 680 is operated automatically as the user sits in the vehicle. Activating remote control 602 sets the trailer brakes 612 and then releases the pin 684 using a solenoid for example. Once the pin 684 is released the vehicle can be pulled forward to extend the trailer or backed up to collapse the trailer. The pin 684 can then be released remotely to lock the trailer in position and the brakes 612 can be released. This allows a person to operate the trailer without getting out of the tow vehicle.

Although the present invention has been described with reference to particular embodiments, workers skilled in the art will recognize that changes may be made in form and detail without departing from the spirit and scope of the invention. For example, though shown with a boat trailer it will be understood that the trailer could be a utility trailer or any other type of trailer that might benefit from the ability to change the overall trailer length. An example might be a trailer used to haul lumber.

The invention claimed is:

1. An extendable trailer comprising;
   wheels carrying a fixed frame, said fixed frame including a fixed support carrying a plurality of bearings,
   an extendable support tube passing through said fixed support and being supported by said fixed support on said bearings,
   said fixed frame includes trailer lights and a wire harness connected to said lights and said harness is contained within a wire support, said wire support fixed to said fixed frame and said wire support contained within said extendable support tube and protects said wire harness,
   a portion of a trailer hitch supported on said extendable support tube
   such that said trailer has a first position where said extendable support tube is retracted into said fixed support and a second position wherein said extendable support tube is extended.

2. The trailer of claim 1 wherein the wire harness includes electrical wires having a first position wherein said wires are coiled up and a second position wherein said wires are uncoiled.

3. The trailer of claim 1 wherein said fixed support is a fixed support tube and has a length and said plurality of bearings includes a set of bearings on a first end of said fixed support tube and a second set of bearings on an opposite end of said fixed support tube such that said extendable support tube is supported on bearings over at least a portion of its length.

4. The trailer of claim 1 wherein said fixed frame includes an open channel aligned with said fixed support such that when said trailer is in a collapsed position a portion of said extendable support rests on at least one roller in said open channel.

5. The trailer of claim 1 wherein said trailer includes a plurality of roller guides and is used to transport a boat.

6. The trailer of claim 1 wherein said trailer includes a release pin such that release of said release pin allows said extendable support tube to move and wherein said release pin engages an opening in said extendable support tube to lock said extendable support tube in place.

7. The trailer of claim 1 wherein said bearings are roller bearings.

8. An extendable boat trailer comprising;
   wheels carrying a fixed frame,
   a fixed support on said frame carrying a plurality of bearings, an extendable support passing through said fixed support and being supported in said fixed support on said bearings,
   a wire harness contained within a wire harness carrier, said wire harness carrier fixed to said frame and said carrier contained within said extendable support tube,
   a portion of a trailer hitch supported on said extendable support, such that said trailer has a first position where said extendable support is collapsed and a second position wherein said extendable support is extended.

9. The extendable boat trailer of claim 8 wherein said fixed support is a first length of tubing having a first portion of said plurality of bearings mounted on a first end and a second portion of said bearings mounted on a second end.

10. The extendable boat trailer of claim 9 wherein said extendable support is a second length of tubing sized to fit with said first length of tubing and supported on said plurality of bearings.

11. The extendable boat trailer of claim 10 wherein said trailer includes a plurality of guides and is used to transport a boat.

12. The extendable boat trailer of claim 10 wherein said portion of a trailer hitch is a receiver hitch adapted to accept a ball hitch on a towing vehicle.

13. An extendable trailer comprising;
wheels carrying a fixed frame,
a fixed support tube carrying a plurality of bearings,
an extendable support tube passing through said fixed support tube and being supported in said fixed support tube on said bearings,
a portion of a trailer hitch supported on said extendable support tube,
such that said trailer has a first position where said extendable support tube is collapsed and a second position wherein said extendable support tube is extended and wherein said fixed frame includes a channel aligned with said fixed support such that when said trailer is in a collapsed position a portion of said extendable support rests in said channel, a wire harness contained within a wire support, said wire support fixed to said fixed frame and said wire support contained within said extendable support tube.

14. The extendable trailer of claim 13 wherein a pin locks the support tube in said first and second position and wherein said pin is controlled remotely.

* * * * *